(12) United States Patent
Nebendahl (10) Patent No.: US 8,744,277 B2
(45) Date of Patent: Jun. 3, 2014

(54) CALIBRATING AN OPTICAL DOWNCONVERTER

(75) Inventor: Bernd Nebendahl, Leonberg (DE)

(73) Assignee: Agilent Technologies, Inc., Santa Clara, CA (US)

( * ) Notice: Subject to any disclaimer, the term of this patent is extended or adjusted under 35 U.S.C. 154(b) by 233 days.

(21) Appl. No.: 13/257,243

(22) PCT Filed: Mar. 19, 2009

(86) PCT No.: PCT/EP2009/053247
§ 371 (c)(1),
(2), (4) Date: Sep. 16, 2011

(87) PCT Pub. No.: WO2010/105684
PCT Pub. Date: Sep. 23, 2010

(65) Prior Publication Data
US 2012/0014691 A1    Jan. 19, 2012

(51) Int. Cl.
*H04B 10/06*    (2011.01)
(52) U.S. Cl.
USPC .......................................... 398/204; 398/208
(58) Field of Classification Search
USPC ...................... 398/57, 82, 202–204, 207, 208
See application file for complete search history.

(56) References Cited

U.S. PATENT DOCUMENTS

| | | | |
|---|---|---|---|
| 6,917,031 B1 | 7/2005 | Sun et al. | |
| 7,327,913 B2 * | 2/2008 | Shpantzer et al. | 385/15 |
| 8,340,530 B2 * | 12/2012 | Cai | 398/163 |
| 2007/0147850 A1* | 6/2007 | Savory et al. | 398/208 |
| 2010/0021163 A1* | 1/2010 | Shieh | 398/65 |

FOREIGN PATENT DOCUMENTS

EP    0479256 A2    10/1991

OTHER PUBLICATIONS

Ezra Ip et al. "Coherent detection in optical fiber systems", Optics Express, vol. 16, No. 2, Jan. 21, 2008, p. 753-791.
Leonid G. Kazovsky, "Phase- and Polarization-Diversity Coherent Optical Techniques", Journal of Lightwave Technology. vol. 7. No. 2. Feb. 1989, pp. 279-292.

* cited by examiner

*Primary Examiner* — Dalzid Singh (57) ABSTRACT

An apparatus calibrates an optical downconverter configured to receive an optical input signal at a signal input and an optical reference signal at a reference input, and to provide at multiple output nodes characterizing signals for characterizing the optical input signal. The downconverter includes receivers having corresponding optical inputs and respectively providing the characterizing signals at the output nodes, and multiple optical signal paths connected between one of the signal and reference inputs and one of the optical inputs. The apparatus includes a signal analyzing unit coupled to the output nodes and configured to receive and analyze the characterizing signals, a first switch for selectively enabling the optical input signal, and a second switch for selectively enabling the reference signal. The signal analyzing unit is configured to derive correction values based on determined signals at the output nodes derived from selectively enabling at least one of the optical input signal and the reference signal, and to correct the characterizing signals with the derived correction values.

18 Claims, 4 Drawing Sheets

Fig. 5

CALIBRATING AN OPTICAL DOWNCONVERTER

BACKGROUND ART

The present invention relates to detection of optical signals in particular with respect to phase and amplitude.

In high-speed optical telecommunication, the phase of the optical signal has become increasingly important as additional degree of freedom for transmitting information. A know concept is usually referred to as coherent detection.

In coherent detection, an optical receiver provides (time dependent) electrical signals thus allowing determining the time dependent course of the optical signal with respect to its amplitude and phase. The time dependent course of the phase contains the digital data content of the optical signal.

Coherent detection in optical fiber systems is outlined in the articles "Coherent detection in optical fiber systems", by Ezra Ip, Alan Pak Tao Lau, Daniel J. F. Barros, Joseph M. Kahn, 21 Jan. 2008, Vol. 16, No. 2, OPTICS EXPRESS, p. 753 ff; or in "Phase- and Polarization-Diversity Coherent Optical Techniques", by Leonid G. Kazovsky, JOURNAL OF LIGHTWAVE TECHNOLOGY, VOL 7, NO. 2, FEBRUARY 1989, page 219 ff.

DISCLOSURE

It is an object of the invention to provide an improved detection of optical signals in particular with respect to phase and amplitude. The object is solved by the independent claim(s). Further embodiments are shown by the dependent claim(s).

In the past it was sufficient to detect the power of the optical carrier, which can be done using a photodiode that converts power into an electrical current. For an optical carrier S with a carrier frequency $\omega_S$ using a complex amplitude with phase $\phi$ and real amplitude A, a detecting photodiode generates a current $I_{photo}$ that is proportional to the product of the signal and its complex conjugate:

$$I_{photo} \propto S \cdot S^* = \underbrace{(A_S e^{i\phi_S} e^{i\omega_S t})}_{S} \cdot \underbrace{(A_S e^{-i\phi_S} e^{-i\omega_S t})}_{S^*} = A_S^2 \quad (1)$$

As can be seen, the phase is lost when detecting the power with the photodiode. New modulation schemes require being able to measure the phase $\phi_S$, and in case of polarization multiplexed signals the phase may even be measured polarization resolved. However, the phase of an optical carrier is typically not directly measurable, but is measured in relation to a phase reference. Once a phase reference is available it is possible to convert the phase difference between the signal and the phase reference into power and from that (e.g. by using conventional detection methods) to convert the power into an electrical current. If the optical carrier S is superimposed with a phase reference R that has its own frequency and amplitude, this results in:

$$I_{photo} \propto (S+R) \cdot (S+R)^* = \left(\frac{A_S e^{i\phi_S} e^{i\omega_S t}}{S} + \frac{A_R e^{i\phi_R} e^{i\omega_R t}}{R}\right) \cdot (\ldots)^* = \quad (2)$$

$$A_S^2 + A_R^2 + 2 \cdot A_S A_R \cdot \cos(\Delta\phi + \Delta\omega \cdot t)$$

The result has time independent terms that represent the power of the signals S and phase reference R, and in addition there is a term that depends on the phase difference $\Delta\phi$—usually called the beat term. Amplitude changes and phase changes now both result in changes of the photocurrent. This may have some implications in the practical realization of the measurement of the phase in the presence of amplitude modulation. Most methods currently discussed use this principle of comparing the signal phase to a reference phase using an interferometer superimposing two signals to convert any phase difference into amplitude to finally measure the phase difference with a direct detector like a photodiode.

There are two basic principles to obtain the phase reference for a phase measurement. Either the signal itself can be used to generate a phase reference, or an independent source can be used as phase reference. A delayed signal can be applied as a phase reference for the signal itself in a so called delay line interferometer. Another method uses a so called local oscillator as phase reference. The local oscillator may be free running, sent out from the transmitter, or to some extent locked to the transmitter carrier.

As shown above, the direct detection of the superposition of signal and reference signal contains parts that are not depending on the phase at all. To avoid phase independent parts, the superposition of two optical waves can derived e.g. by using a partially reflecting mirror or a fiber optic coupler (such as a fiber optic 2×2 coupler). Coupling a photodiode at each arm of such interferometer and measuring a signal difference of the photocurrents of the photodiodes results in:

$$I_1 - I_2 \propto \underbrace{((S+R) \cdot (S+R)^*)}_{I_1} - \underbrace{((S-R) \cdot (S-R)^*)}_{I_2} = \quad (3)$$

$$4 \cdot A_S A_R \cdot \cos(\Delta\phi + \Delta\omega \cdot t)$$

Subtracting the photocurrents of the two photodiodes preserves the beat term while the time independent terms cancel out. The reason for this is a general property of the coupler that creates different phase differences between its output arms. In case of a 2×2 coupler the relative phase difference between the input signals S and R in both arms is exactly π or written as complex number $e^{i\pi}=-1$.

In embodiments of the present invention, an optical downconverter is applied which is configured to receive an optical input signal to be measured at a signal input and an optical reference signal at a reference input, and to provide as output at a plurality of output nodes a plurality of characterizing signals for characterizing the optical input signal (e.g. with respect to its phase and amplitude). Such downconverter comprises a plurality of receivers, which may be balanced receivers. Each receiver has at least one optical input and provides at one of the plurality of output nodes an electrical signal, which is one of the plurality of characterizing signals, In case of balanced receivers, the electrical signal represents a signal difference between signals applied at its two optical inputs. The downconverter further comprises a plurality of optical signal paths between the signal input and each input of the plurality of receivers, a plurality of optical signal paths between the reference input and each input of the plurality of receivers, and at least one phase shifter coupled in one of the plurality of optical signal paths and being configured to provide a phase shift between its input and its output.

Embodiments of the invention provide methods and apparatuses for calibrating such optical downconverter.

One embodiment comprises determining signals at the plurality of output nodes, and deriving from the determined signals a first set of correction values for correcting the plurality of characterizing signals. The first set of correction values relate to a time-independent or time-invariant property of the characterizing signals, which may be insertion loss on the plurality of optical signal paths.

In one embodiment, the input signal is disabled and a first set of signals is determined at the plurality of output nodes. Then, the reference signal is disabled and a second set of signals is determined at the plurality of output nodes. The first set of correction values is derived from the determined first and second sets of signals for correcting the plurality of characterizing signals.

In another embodiment, the first set of correction values is derived from averaging the determined signals over time.

In one embodiment each receiver is a balanced receiver, the provided electrical signal of which representing a signal difference between signals applied at its optical inputs, and each balanced receiver is configured to provide an opto-electrical conversion for each of the two optical inputs.

For such embodiment with balanced receivers, a second set of correction values can be derived by disabling the input signal and determining a third set of signals from the opto-electrical conversion for each of the two optical inputs of each balanced receiver. Then, the reference signal is disabled and a fourth set of signals derived from the opto-electrical conversion is disabled for each of the two optical inputs of each balanced receiver. The second set of correction values is derived from the determined third and fourth sets of signals for correcting the plurality of characterizing signals.

The embodiment with balanced receivers may further comprise at least one polarization splitter in one of the plurality of optical signal paths. Each polarization splitter is configured to receive a signal applied at its input and to output at least one signal derived from the signal applied at its input, wherein each output signal has a different state of polarization. In such embodiment, a third set of correction values can be derived (instead of the second set of correction values) by disabling the input signal and determining the third set of signals derived from the opto-electrical conversion for each of the two optical inputs of each balanced receiver. Then instead of determining the fourth set of signals, disabling the input signal and the reference signal, coupling a non-polarized signal to the signal input, and determining a sixth set of signals derived from the opto-electrical conversion for each of the two optical inputs of each balanced receiver, wherein the non-polarized signal has a degree of polarization of substantially zero. The third set of correction values is then derived from the determined third and sixth sets of signals for correcting the plurality of characterizing signals.

The second and/or third set of correction values relate to a time-dependent or time-variant property of the characterizing signals, which might be one of an error, unbalance, and mismatch in the signal difference determined by at least one of the plurality of balanced receivers.

In one embodiment, a fourth set of correction values can be derived by coupling a first wavelength signal to the signal input, and determining at one of the output nodes a first beat frequency of the characterizing signals representing a first mixed frequency resulting from the reference signal and the first wavelength signal, Then, coupling to the signal input a second wavelength signal having a different wavelength than the first wavelength signal, and determining at one of the output nodes a second beat frequency of the characterizing signals representing a second mixed frequency resulting from the reference signal and the second wavelength signal. The fourth set of correction values is then derived from the determined first and second beat frequencies for correcting the plurality of characterizing signals. The fourth set of correction values relates to differences in the run time between different ones of the optical signal paths.

In one embodiment, a fifth set of correction values can be derived by coupling a first wavelength signal to the signal input, and determining a first phase difference between two of the characterizing signals, wherein one of the characterizing signals is derived from one of the optical signal paths having the phase shifter. Then, coupling to the signal input a second wavelength signal having a different wavelength than the first wavelength signal, and determining a second phase difference between two of the characterizing signals, wherein one of the characterizing signals is derived from one of the optical signal paths having the phase shifter. The fifth set of correction values is then derived from the determined first and second phase differences for correcting the plurality of characterizing signals. The fifth set of correction values relates to the phase shift as provided by the phase shifter.

It is clear that as more of the correction values are determined, the precise the correction can be achieved. However, dependent on the application one or more sets of the correction values can be determined. In one embodiment, only the first set of correction values is sufficient e.g. for common mode rejection. One or more of the second to fifth set of correction values might be determined and applied in addition, e.g. in order to enhance measurement of the characterizing signals.

The plurality of characterizing signals can then be corrected with one or more of the derived sets of correction values. The correction can be provided to a measurement of the plurality of characterizing signals succeeding any measurement of the plurality of characterizing signals for deriving the one or more sets of correction values.

When referring to "determining" a respective signal, this can comprise actually measuring the respective signal.

In one embodiment for analyzing the optical input signal, the plurality of characterizing signals are provided at the plurality of output nodes of the downconverter and corrected by using correction values as derived in one or more of the embodiments described above. Based on the corrected plurality of characterizing signals, at least one of: phase, amplitude, digital data content, and waveform of the optical input signal is determined and might be used for further processing (e.g. as described by the documents referred to in the introductory part of this description).

In one embodiment, an apparatus for calibrating the optical downconverter comprises a signal analyzing unit coupled to the plurality of output nodes and being configured to receive and analyze the plurality of characterizing signals. The apparatus further comprises a first switch for selectively enabling or disabling the input signal, and a second switch for selectively enabling or disabling the reference signal. The signal analyzing unit is configured to derive correction values (e.g. the first set of correction values) based on determined signals at the plurality of output nodes derived from selectively enabling or disabling at least one of the input signal and the reference signal. The signal analyzing unit is configured for correcting the plurality of characterizing signals with the derived correction values.

In one embodiment, wherein each receiver is a balanced receiver comprising two photodetectors, wherein the provided electrical signal represents a signal difference between photocurrents provided by the two photodetectors, the apparatus further comprises a plurality of bias circuits. Each bias circuit is coupled to one of the photodetectors for measuring the photocurrent through the photodetector. The signal analyzing unit is configured to derive the correction values based on the measured photocurrents, and for correcting the plurality of characterizing signals with the derived correction values.

One embodiment further comprises a polarization splitter in one of the plurality of optical signal paths. The polarization splitter is configured to receive a signal applied at its input and to output at least one signal derived from the signal applied at its input, wherein each output signal has a different state of polarization. A signal source is provided and configured to couple a non-polarized signal to the signal input, wherein the non-polarized signal has a degree of polarization of substantially zero. The signal analyzing unit might be configured to derive the third set of correction values based on the measured photocurrents, and for correcting the plurality of characterizing signals with the third set of correction values.

Embodiments of the invention can be partly or entirely embodied or supported by one or more suitable software programs, which can be stored on or otherwise provided by any kind of data carrier, and which might be executed in or by any suitable data processing unit.

BRIEF DESCRIPTION OF DRAWINGS

Other objects and many of the attendant advantages of embodiments of the present invention will be readily appreciated and become better understood by reference to the following more detailed description of embodiments in connection with the accompanied drawing(s). Features that are substantially or functionally equal or similar will be referred to by the same reference sign(s).

Figure 1:
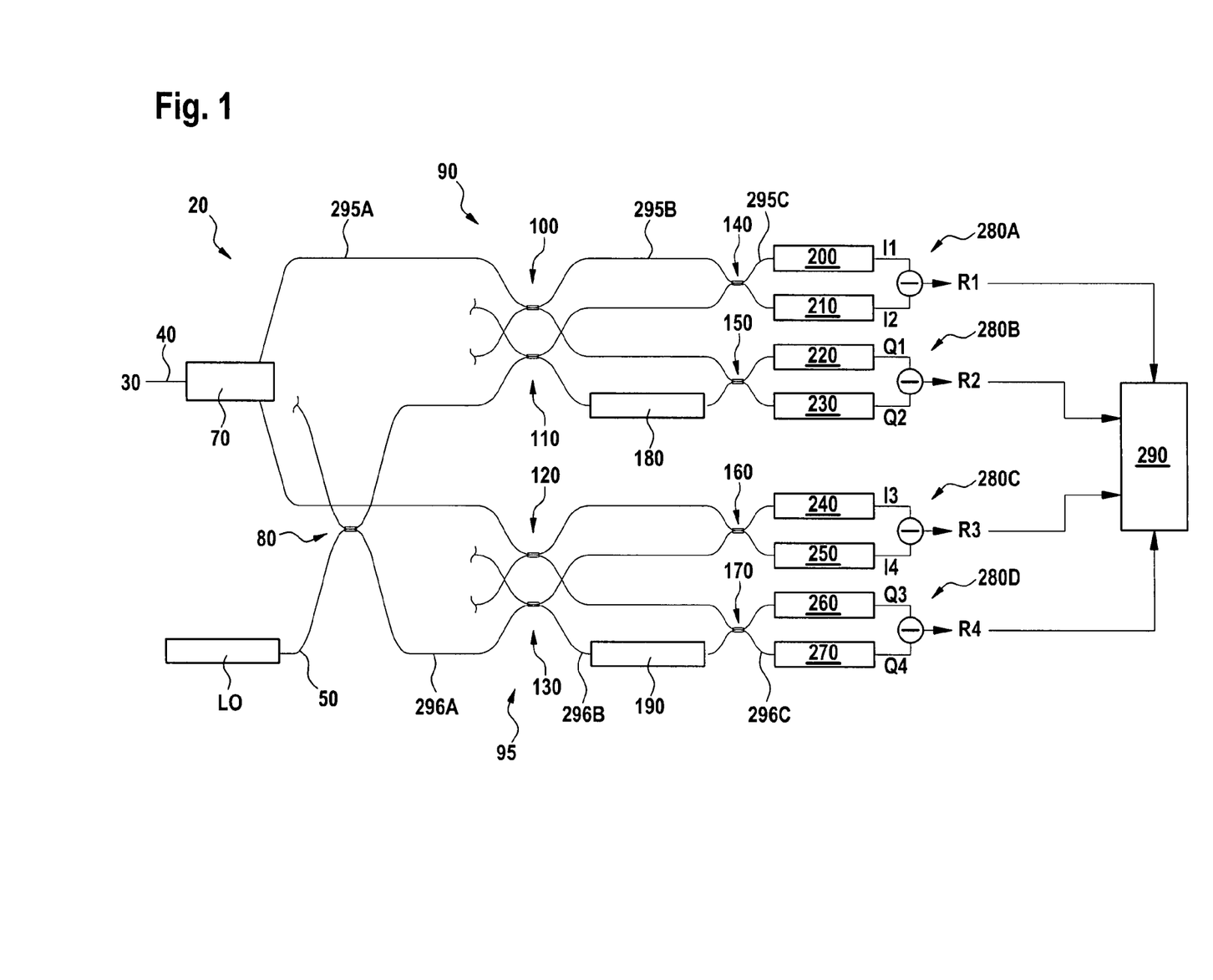
FIGS. 1 and 2 depict embodiments of optical downconverters 20.

FIG. 1 depicts an embodiment of an optical downconverter 20 receiving an optical input signal 30 (to be measured) at a signal input 40 and an optical reference signal LO at a reference input 50. The down-converting provided by the downconverter 20 is often referred to as homodyne in case the frequencies of signal input 40 and the optical reference signal LO are equal. Otherwise, the down-converting might be referred to as heterodyne.

The optical part of the downconverter 20 provides a plurality of optical mix signals I1, I2, I3, I4, Q1, Q2, Q3, Q4 derived from the optical input signal 30 and the optical reference signal LO. In FIG. 1, the optical mix signals I1, I2, I3, I4, Q1, Q2, Q3, Q4 are not directly depicted, but only by their electrical representation, as will be explained later.

The optical input signal 30 is coupled to a polarization beam splitter (PBS) 70, which splits up the optical input signal 30 in two signals $S^{TE}$ and $S^{TM}$, having orthogonal polarization (e.g. linear horizontal or linear vertical). The optical reference signal LO is split up by a beam splitter 80 into beams LO1 and LO2 (e.g. into two substantially equal portions as indicated by 50/50). The signals $S^{TE}$ and LO1 are coupled to a first combiner 90, and the signals $S^{TM}$ and LO2 are coupled to a second combiner 95. Each of the first combiner 90 and the second combiner 95 combines—as will be shown later—the respective input signals to provide the optical mix signals I1, I2, I3, I4, Q1, Q2, Q3, Q4.

In the embodiment of FIG. 1 the first combiner 90 comprises beam splitters 100, 110, and the second combiner 95 comprises beam splitters 120, 130, each of the beam splitters 100, 110, 120, and 130 splitting its respective incoming beam into two substantially equal portions. The first combiner 90 further comprises combiners 140 and 150 receiving the split up beams from beam splitters 100, 110, and the second combiner 95 comprises combiners 160 and 160 receiving the split up beams from beam splitters 120, 130. A phaseshifter 180 is coupled between the beam splitter 110 and the combiner 150, to provide a 90° phase shift to the partial output beam of beam splitter 110 coupled to the combiner 150 (with respect to the other partial output beam coupled to the combiner 140). Accordingly a further phaseshifter 190 is coupled between the beam splitter 130 and the combiner 170, to provide a 90° phase shift to the partial output beam of beam splitter 130 coupled to the combiner 170 (with respect to the other partial output beam coupled to the combiner 160).

Figure 2:
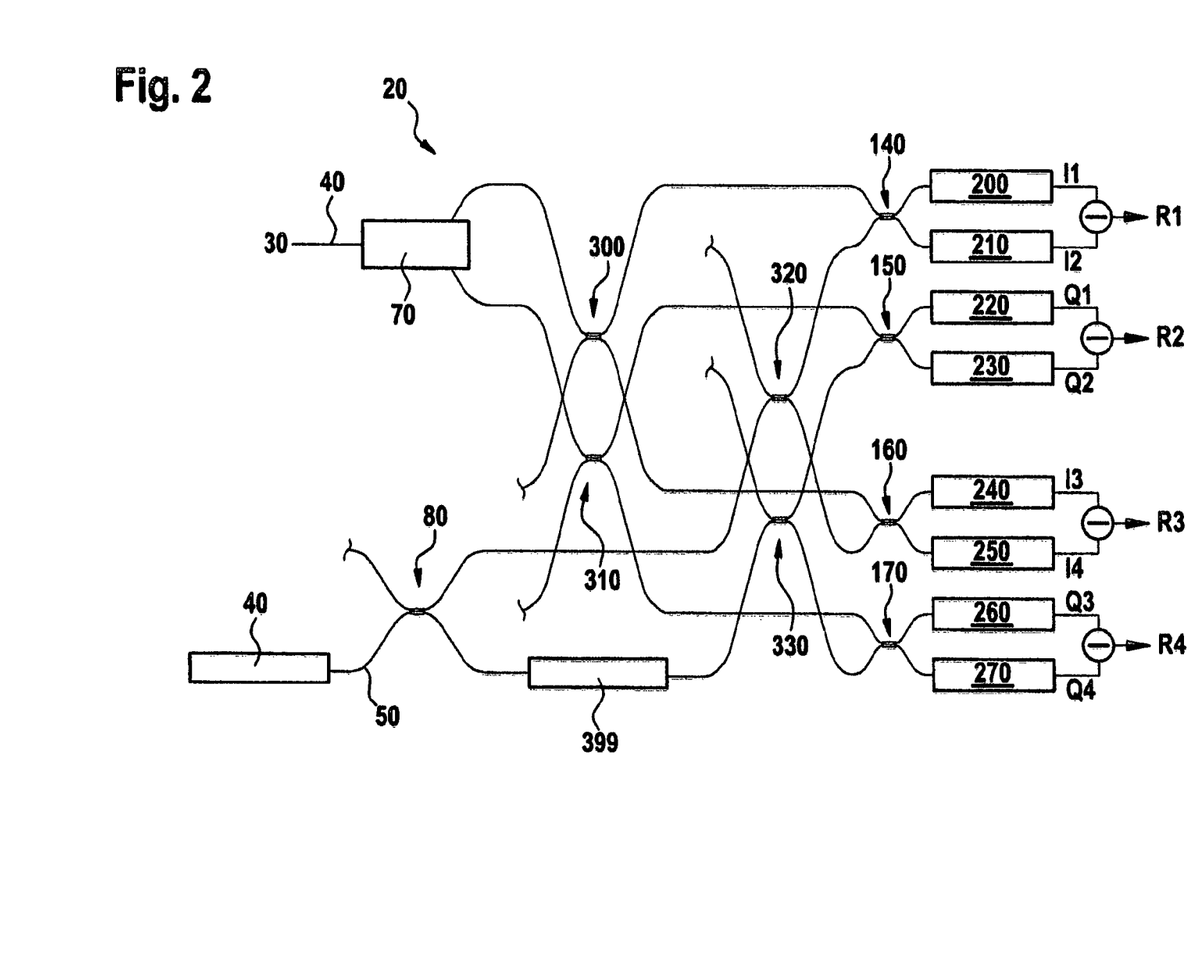

It is clear that the optical arrangement as depicted in the embodiment of in FIG. 1 can be provided in any suitable form, such as in free space optics, using planar lightwave circuits, fiber optic components, a combination thereof, etc. The embodiment of FIG. 1 is exemplarily depicted using fiber-optic elements. The beam splitters 100, 110, 120, and 130 are each embodied by a respective fiber optic 2.times.2 coupler, wherein only one of the two inputs is used while the other is left open. The combiners 140, 150, 160, and 170 are also embodied by respective fiber optic 2.times.2 couplers, however with both inputs and outputs being connected as indicated in FIG. 2B.

Further in FIG. 1, the optical mix signal output from the combiner 140 is coupled to a photodetector 200, which outputs an electrical signal I1 representing an opto-electric conversion of the optical mix signal I1. Accordingly, each photodetector 200-270 provides an opto-electric conversion of its respective input signal of the optical mix signals I1, I2, I3, I4, Q1, Q2, Q3, Q4. As said above, for the sake of simplicity only the opto-electric conversion signals I1, I2, I3, I4, Q1, Q2, Q3, Q4 are denoted in FIG. 1.

The (electrical) outputs I1 and I2 of the photodetectors 200 and 210 are coupled to provide a balanced receiver 280A having an output R1, the outputs Q1 and Q2 of photodetectors 220 and 230 are coupled to provide a balanced receiver 280B having an output R2, the outputs I3 and I4 of photodetectors 240 and 250 are coupled to provide a balanced receiver 280C having an output R3, and the outputs Q3 and Q4 of photodetectors 260 and 270 are coupled to provide a balanced receiver 280D having an output R4. The output (R1-R4) of each respective balanced receiver 280 represents a signal difference between the signals applied at its two optical inputs. Accordingly, signal R1 represents the signal difference of the signals I1 and I2, signal R2 represents the signal difference of the signals Q1 and Q2, etc.

Figure 3:
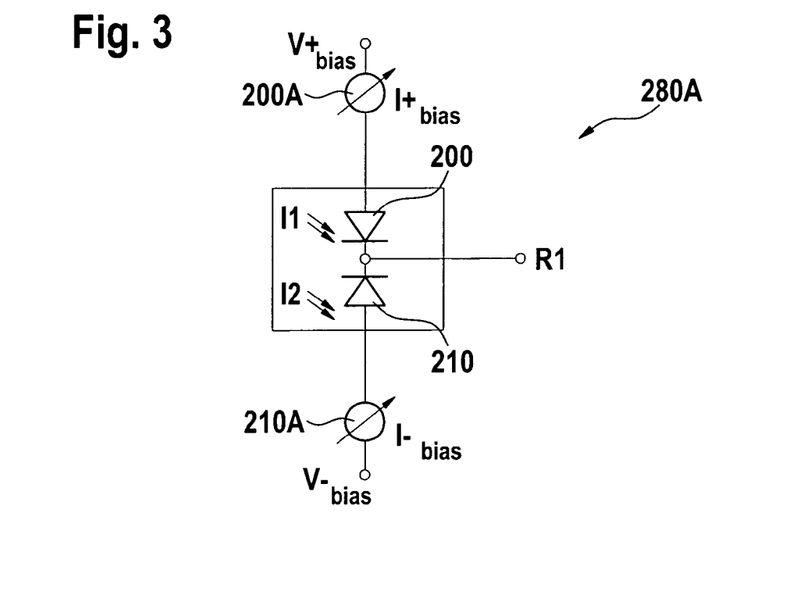
FIG. 3 depicts a schematic representation of a balanced receiver 280.

FIG. 3 depicts a schematic representation of such balanced receiver 280, as exemplarily shown for the balanced receiver 280A. Each photodetector 200 and 210 is provided with a respective bias circuit 200A and 210A for supplying a respective bias current into the respective balanced receiver 280A. A photocurrent derived by the photodetector 200 from the optical mix signal I1 and a photocurrent derived by the photodetector 210 from the optical mix signal I2 are coupled (in opposed direction) to node R1, thus representing the signal difference I1-I2. The bias circuits 200A and 210A (both schematically represented in FIG. 3) are operated, so that the output signal R1 represents the signal difference between the signals I2 and I1 as opto-electrically converted by the photodiodes 210 and 200.

It goes without saying that the other balanced receivers (280A-280D) 280B-D can be embodied mutatis mutandis.

The output signals R1-R4 can be coupled to a signal analyzing unit 290, which can be a set of analog-to-digital converters connected to a processing unit like e.g. in a real time or sampling oscilloscope. The signal analyzing unit 290 may convert the analog output signals to the digital domain and do all further signal processing in the digital domain.

Turning back to FIG. 1, the optical downconverter 20 provides a plurality of optical signal paths between the signal input 40 and each input of the plurality of balanced receivers 280A-280D. One example is depicted in FIG. 1, namely the optical signal path starting from the signal input 40 and being provided by the PBS 70, a line 295A (e.g. an optical fiber) between the PBS 70 and the beam splitter 100, the beam splitter 100, a line 295B (e.g. an optical fiber) between the beam splitter 100 and the combiner 140, the combiner 140, and a line 295C (e.g. an optical fiber) between the combiner 140 and the photodetector 200.

The optical downconverter 20 further provides a plurality of optical signal paths between the reference input 50 and each input of the plurality of balanced receivers 280A-280D. One example is depicted in FIG. 1, namely the optical signal path starting from the reference input 50 and being provided by the beam splitter 80, a line 296A (e.g. an optical fiber) between the beam splitter 80 and the beam splitter 130, the beam splitter 130, a line 296B (e.g. an optical fiber) between the beam splitter 130 and the combiner 170 and also covering the phaseshifter 190, the combiner 170, and a line 296C (e.g. an optical fiber) between the combiner 170 and the photodetector 270.

FIG. 2 shows another embodiment of the optical downconverter 20, which substantially corresponds to the embodiment of FIG. 1 and only the differing features shall be explained. Main difference is that the embodiment of FIG. 2 only employs one phase shifter 399 (instead of the two phase shifters 180 and 190 of FIG. 1). The optical paths have to reconfigured accordingly and comprise four couples 300, 310, 320, and 330, arranged as schematically depicted in FIG. 2. The remaining components can be used applied as in FIG. 1.

The optical downconverter 20 of the embodiment of FIG. 1 provides a coherent receiver together with detection in time domain, which can be applied for detecting phase and amplitude modulated signals. The same applies to the embodiment of FIG. 2, but for the sake of simplicity only FIG. 1 shall be referred to the following. Turning back to equation $$I_1 - I_2 \propto \frac{((S+R)\cdot(S+R)^*)}{I_1} - \frac{((S-R)\cdot(S-R)^*)}{I_2} = \quad (3)$$

$$4 \cdot A_S A_R \cdot \cos(\Delta\phi + \Delta\omega \cdot t),$$

which represents the output of each of the outputs R1-R4, it can be seen that the beat terms will provide access to the phase of the signal phase relative to the local oscillator phase. Two interferometers (provided between the beam splitters 100, 110 and the combiners 140, 150) can be used to create in-phase and quadrature signals. The embodiment of FIG. 1 provides two further interferometers (between the beam splitters 120, 130 and the combiners 160, 170) allowing receiving polarization multiplexed signals. The four outputs R1-R4 will contain the following signals:

$$R_1 = I_1 - I_2 \propto 4 \cdot A_S^h \cdot A_R \cdot \cos(\Delta\phi - \Delta\omega \cdot t)$$

$$R_2 = Q_1 - Q_2 \propto 4 \cdot A_S^h \cdot A_R \cdot \sin(\Delta\phi - \Delta\omega \cdot t)$$

$$R_3 = I_3 - I_4 \propto 4 \cdot A_S^v \cdot A_R \cdot \cos(\Delta\phi - \Delta\omega \cdot t)$$

$$R_4 = Q_3 - Q_4 \propto 4 \cdot A_S^v \cdot A_R \cdot \sin(\Delta\phi - \Delta\omega \cdot t)$$

The upper index h and v distinguish between the horizontal and vertical polarization of the signal 30 with respect to the polarization frame of the receiver. There is still a time dependency present in these signals originating from the frequency offset between carrier 30 and local oscillator LO. This frequency offset will be zero if the local oscillator LO is optically phase locked to the carrier. However, this turns out to be quite difficult, since many of the advanced modulation formats do not contain a strong carrier to lock to. Today's transmitter lasers and local oscillator offer enough stability and frequency accuracy to keep the offset within a few 100 MHz, and the symbol (i.e. the smallest information unit) rates are as high as a few GBaud, so it is possible to recover the frequency offset or—in other words—the carrier phase by signal post processing. The tolerance of the post processing algorithms depends on the actual modulation format. An upper limit of the frequency offset can be estimated, which an algorithm can compensate. This can be done by finding the smallest distance $\phi_{offset}$ that any two symbols with similar amplitude can have along the phase axis (e.g. $\pi/2$ for QPSK). The phase error due to the frequency offset within one symbol period should be smaller than half of that. Or in other words the maximum frequency offset is given by $$v_{offset} = \frac{\phi_{min}}{4\pi} \cdot v_{Symbol}$$

In the above example of QPSK and a symbol rate of 10 GBaud, this results in ~1.2 GHz or 12% of the symbol rate. In reality the number may be slightly smaller and in the order of 10% for QPSK, and since the symbol distance in BPSK is twice as big along the phase axis around 20% for BPSK.

The above schematics allow detection of polarization multiplexed signals without the need of any optical polarization control. This is because the signals are a measure of the electrical field of the optical wave and not of the power (the field amplitude is linear in the terms). This allows mathematically compensating for polarization misalignment and polarization mode dispersion. Even more general any linear distortion like for example chromatic dispersion on the transmission can be compensated.

The optical mix signals I1, I2, I3, I4, Q1, Q2, Q3, Q4 can be represented as:

$$I_1 = S^{TE} \cdot e^{i\omega_S t} + LO \cdot e^{i\omega_{LO} t}$$

$$I_2 = S^{TE} \cdot e^{i\omega_S t} - LO \cdot e^{i\omega_{LO} t}$$

$$Q_1 = S^{TE} \cdot e^{i\omega_S t} + i \cdot LO \cdot e^{i\omega_{LO} t}$$

$$Q_2 = S^{TE} \cdot e^{i\omega_S t} - i \cdot LO \cdot e^{i\omega_{LO} t}$$

$$I_3 = S^{TM} \cdot e^{i\omega_S t} + LO \cdot e^{i\omega_{LO} t}$$

$$I_4 = S^{TM} \cdot e^{i\omega_S t} - LO \cdot e^{i\omega_{LO} t}$$

$$Q_3 = S^{TM} \cdot e^{i\omega_S t} + i \cdot LO \cdot e^{i\omega_{LO} t}$$

$$Q_4 = S^{TM} \cdot e^{i\omega_S t} - i \cdot LO \cdot e^{i\omega_{LO} t}$$

The formulas given above, however, only apply for an ideal system. For describing a real world system a number of constants are introduced, which represent individual loss and skew values for the different optical paths (i.e. the respective paths between the signal input 40 and each respective output node 60, and the respective paths between the reference input 50 and each respective output node 60). Accordingly, instead of $I_1$ the following signal $I^{meas}_1$ will be measured, instead of $I_2$ the following signal $I^{meas}_2$ will be measured, etc.:

$$I^{meas}_1 = \sqrt{IL_{STE,I_1}} \cdot S^{TE} \cdot e^{i\omega_S(t-t_{I_1})} + \sqrt{IL_{LO,I_1}} \cdot LO \cdot e^{i\omega_{LO}(t-t_{I_1})}$$

$$I^{meas}_2 = \sqrt{IL_{STE,I_2}} \cdot S^{TE} \cdot e^{i\omega_S(t-t_{I_2})} - \sqrt{IL_{LO,I_2}} \cdot LO \cdot e^{i\omega_{LO}(t-t_{I_2})}$$

$$Q^{meas}_1 = \sqrt{IL_{STE,Q_1}} \cdot S^{TE} \cdot e^{i\omega_S(t-t_{Q_1})} + \sqrt{IL_{LO,Q_1}} \cdot e^{i\phi_{TE}} \cdot LO \cdot e^{i\omega_{LO}(t-t_{Q_1})}$$

$$Q^{meas}_2 = \sqrt{IL_{STE,Q_2}} \cdot S^{TE} \cdot e^{i\omega_S(t-t_{Q_2})} - \sqrt{IL_{LO,Q_2}} \cdot e^{i\phi_{TE}} \cdot LO \cdot e^{i\omega_{LO}(t-t_{Q_2})}$$

$$I^{meas}_3 = \sqrt{IL_{STM,I_3}} \cdot S^{TM} \cdot e^{i\omega_S(t-t_{I_3})} + \sqrt{IL_{LO,I_3}} \cdot LO \cdot e^{i\omega_{LO}(t-t_{I_3})}$$

$$I^{meas}_4 = \sqrt{IL_{STM,I_4}} \cdot S^{TM} \cdot e^{i\omega_S(t-t_{I_4})} - \sqrt{IL_{LO,I_4}} \cdot LO \cdot e^{i\omega_{LO}(t-t_{I_4})}$$

$$Q^{meas}_3 = \sqrt{IL_{STM,Q_3}} \cdot S^{TM} \cdot e^{i\omega_S(t-t_{Q_3})} + \sqrt{IL_{LO,Q_3}} \cdot e^{i\phi_{TM}} \cdot LO \cdot e^{i\omega_{LO}(t-t_{Q_3})}$$

$$Q^{meas}_4 = \sqrt{IL_{STM,Q_4}} \cdot S^{TM} \cdot e^{i\omega_S(t-t_{Q_4})} - \sqrt{IL_{LO,Q_4}} \cdot e^{i\phi_{TM}} \cdot LO \cdot e^{i\omega_{LO}(t-t_{Q_4})}$$

With ideal signals, the four balanced receivers 280A-D provide the following voltages:

$$R_1 = |I_1|^2 - |I_2|^2 = |S^{TE} + LO|^2 - |S^{TE} - LO|^2 = 4|S^{TE}||LO| \cdot \cos((\omega_S - \omega_{LO}) \cdot t)$$

$$R_2 = |Q_1|^2 - |Q_2|^2 = |S^{TE} + j \cdot LO|^2 - |S^{TE} - j \cdot LO|^2 = 4|S^{TE}||LO| \cdot \sin((\omega_S - \omega_{LO}) \cdot t)$$

$$R_3 = |I_3|^2 - |I_4|^2 = |S^{TM} + LO|^2 - |S^{TM} - LO|^2 = 4|S^{TM}||LO| \cdot \cos((\omega_S - \omega_{LO}) \cdot t)$$

$$R_4 = |Q_3|^2 - |Q_4|^2 = |S^{TM} + j \cdot LO|^2 - |S^{TM} - j \cdot LO|^2 = 4|S^{TM}||LO| \cdot \sin((\omega_S - \omega_{LO}) \cdot t)$$

Considering real world signals, the following actual signals $R^{meas}_i$ (i=1, ..., 4) will be received instead of the above ideal signals $R_i$ (i=1, ..., 4), taking into account 16 individual losses for the 8 photodiodes 200-270 and the two inputs 40 and 50:

$$R^{meas} = |I^{meas}_1|^2 - |I^{meas}_2|^2$$

$$= \left|\sqrt{IL_{STE,I_1}} S^{TE} \cdot e^{i\omega_S(t-t_{I_1})} + \sqrt{IL_{LO,I_1}} LO \cdot e^{i\omega_{LO}(t-t_{I_1})}\right|^2 -$$

$$\left|\sqrt{IL_{STE,I_2}} S^{TE} \cdot e^{i\omega_S(t-t_{I_2})} - \sqrt{IL_{LO,I_2}} LO \cdot e^{i\omega_{LO}(t-t_{I_2})}\right|^2$$

$$= (IL_{STE,I_1} - IL_{STE,I_2}) \cdot S^{TE^2} + (IL_{LO,I_1} - IL_{LO,I_2}) \cdot LO^2 +$$

$$\left(\sqrt{IL_{STE,I_1}} \sqrt{IL_{LO,I_1}} + \sqrt{IL_{STE,I_2}} \sqrt{IL_{LO,I_2}}\right) \cdot 2 \cdot S^{TE} \cdot LO \cdot \cos((\omega_S - \omega_{LO}) \cdot t + (\omega_S - \omega_{LO}) \cdot (t_{I_1} - t_{I_2}))$$

$$R^{meas}_2 = |Q^{meas}_1|^2 - |Q^{meas}_2|^2$$

$$= \left|\sqrt{IL_{STE,Q_1}} S^{TE} \cdot e^{i\omega_S(t-t_{Q_1})} + j \cdot \sqrt{IL_{LO,Q_1}} LO \cdot e^{i\omega_{LO}(t-t_{Q_1})}\right|^2 - \left|\sqrt{IL_{STE,Q_2}} S^{TE} \cdot e^{i\omega_S(t-t_{Q_2})} - j \cdot \sqrt{IL_{LO,Q_2}} LO \cdot e^{i\omega_{LO}(t-t_{Q_2})}\right|^2$$

$$= (IL_{STE,Q_1} - IL_{STE,Q_2}) \cdot S^{TE^2} + (IL_{LO,Q_1} - IL_{LO,Q_2}) \cdot LO^2 +$$

$$\left(\sqrt{IL_{STE,Q_1}} \sqrt{IL_{LO,Q_1}} + \sqrt{IL_{STE,Q_2}} \sqrt{IL_{LO,Q_2}}\right) \cdot 2 \cdot S^{TE} \cdot LO \cdot \cos((\omega_S - \omega_{LO}) \cdot t + (\omega_S - \omega_{LO}) \cdot (t_{Q_1} - t_{Q_2}) + \varphi_{STE})$$

$$R^{meas}_3 = |I^{mean}_3|^2 - |I^{mean}_4|^2$$

$$= \left|\sqrt{IL_{STM,I_3}} S^{TM} \cdot e^{i\omega_S(t-t_{I_3})} + \sqrt{IL_{LO,I_3}} LO \cdot e^{i\omega_{LO}(t-t_{I_3})}\right|^2 -$$

$$\left|\sqrt{IL_{STM,I_4}} S^{TM} \cdot e^{i\omega_S(t-t_{I_4})} - \sqrt{IL_{LO,I_4}} LO \cdot e^{i\omega_{LO}(t-t_{I_4})}\right|^2$$

$$= (IL_{STM,I_3} - IL_{STM,I_4}) \cdot S^{TM^2} + (IL_{LO,I_3} - IL_{LO,I_4}) \cdot LO^2 +$$

$$\left(\sqrt{IL_{STM,I_3}} \sqrt{IL_{LO,I_3}} + \sqrt{IL_{STM,I_4}} \sqrt{IL_{LO,I_4}}\right) \cdot 2 \cdot S^{TM} \cdot LO \cdot \cos((\omega_S - \omega_{LO}) \cdot t + (\omega_S - \omega_{LO}) \cdot (t_{I_3} - t_{I_4}))$$

$$R^{meas}_4 = |Q^{meas}_3|^2 - |Q^{meas}_4|^2$$

$$= \left|\sqrt{IL_{STM,Q_3}} S^{TM} \cdot e^{i\omega_S(t-t_{Q_3})} + j \cdot \sqrt{IL_{LO,Q_3}} LO \cdot e^{i\omega_{LO}(t-t_{Q_3})}\right|^2 - \left|\sqrt{IL_{STM,Q_4}} S^{TM} \cdot e^{i\omega_S(t-t_{Q_4})} - j \cdot \sqrt{IL_{LO,Q_4}} LO \cdot e^{i\omega_{LO}(t-t_{Q_4})}\right|^2$$

$$= (IL_{STM,Q_3} - IL_{STM,Q_4}) \cdot S^{TM^2} + (IL_{LO,Q_3} - IL_{LO,Q_4}) \cdot LO^2 +$$

$$\left(\sqrt{IL_{STM,Q_3}} \sqrt{IL_{LO,Q_3}} + \sqrt{IL_{STM,Q_4}} \sqrt{IL_{LO,Q_4}}\right) \cdot 2 \cdot S^{TM} \cdot LO \cdot \cos((\omega_S - \omega_{LO}) \cdot t + (\omega_S - \omega_{LO}) \cdot (t_{Q_3} - t_{Q_4}) + \varphi_{STM})$$

The signals $R^{meas}_i$ thus represent the output of the 4 balanced receivers (280A-280D) 280A-D in case of non ideal conditions, like different loss values or responsivities for each path or photodiode 200-270 and different time delays for the different paths.

When analyzing the above terms for $R^{meas}_i$, one can see that some of the terms are time independent, and some of the terms are time dependent in case $\omega_{LO}$ and $\omega_S$ are different. Assuming this condition, the time independent terms can be calculated from the measurement by averaging the measurement over time and define a first set of correction values:

$$\langle R^{meas}_1 \rangle = R^{DC}_1 = (IL_{STE,I_1} - IL_{STE,I_2}) \cdot S^{TE^2} + (IL_{LO,I_1} - IL_{LO,I_2}) \cdot LO^2$$

$$\langle R^{meas}_2 \rangle = R^{DC}_2 = (IL_{STE,Q_1} - IL_{STE,Q_2}) \cdot S^{TE^2} + (IL_{LO,Q_1} - IL_{LO,Q_2}) \cdot LO^2$$

$$\langle R^{meas}_3 \rangle = R^{DC}_3 = (IL_{STE,J_3} - IL_{STE,J_4}) \cdot S^{TE^2} + (IL_{LO,J_3} - IL_{LO,J_4}) \cdot LO^2$$

$$\langle R^{meas}_4 \rangle = R^{DC}_4 = (IL_{STE,Q_3} - IL_{STE,Q_4}) \cdot S^{TE^2} + (IL_{LO,Q_3} - IL_{LO,Q_4}) \cdot LO^2$$

The terms in square brackets (and accordingly parameters with index DC) represent averages over time. The first set of correction values relates to a time-independent (or time-invariant) property of the characterizing signals R1-R4, and in particular to insertion loss on the plurality of optical signal paths.

Subtracting this first set of correction values $R^{DC}_i$ (with i=1, 2, 3, 4) from the measured signals $R^{meas}_i$ will suppress the unwanted DC peak in the spectrum and yields the following expressions:

$$R^{AC}_1 = R^{meas}_1 - R^{DC}_1$$

$$= \left(IL_{STE,I_1} \sqrt{IL_{LO,I_1}} + \sqrt{IL_{STE,I_2}} \sqrt{IL_{LO,I_2}}\right) \cdot 2 \cdot S^{TE} \cdot LO \cdot \cos((\omega_S - \omega_{LO}) \cdot t + (\omega_S - \omega_{LO}) \cdot (t_{I_1} - t_{I_2}))$$

-continued $$R_2^{AC} = R_2^{meas} - R_2^{DC}$$
$$= \left(\sqrt{IL_{STE,Q_1}}\sqrt{IL_{LO,Q_1}} + \sqrt{IL_{STE,Q_2}}\sqrt{IL_{LO,Q_2}}\right) \cdot 2 \cdot S^{TE} \cdot$$
$$LO \cdot \cos((\omega_S - \omega_{LO}) \cdot t + (\omega_S - \omega_{LO}) \cdot (t_{Q_1} - t_{Q_2}) + \varphi_{STE})$$

$$R_3^{AC} = R_3^{meas} - R_3^{DC}$$
$$= \left(\sqrt{IL_{STM,I_3}}\sqrt{IL_{LO,I_3}} + \sqrt{IL_{STM,I_4}}\sqrt{IL_{LO,I_4}}\right) \cdot 2 \cdot S^{TM} \cdot$$
$$LO \cdot \cos((\omega_S - \omega_{LO}) \cdot t + (\omega_S - \omega_{LO}) \cdot (t_{I_3} - t_{I_4}))$$

$$R_4^{AC} = R_4^{meas} - R_4^{DC}$$
$$= \left(\sqrt{IL_{STM,Q_3}}\sqrt{IL_{LO,Q_3}} + \sqrt{IL_{STM,Q_4}}\sqrt{IL_{LO,Q_4}}\right) \cdot 2 \cdot$$
$$S^{TM} \cdot LO \cdot \cos\left(\begin{array}{c}(\omega_S - \omega_{LO}) \cdot t + (\omega_S - \omega_{LO}) \cdot \\ (t_{Q_3} - t_{Q_4}) + \varphi_{STM}\end{array}\right)$$

The terms $R^{AC}_i$ represent the signals as derived by the signal analyzing unit 290 from the signals $R^{meas}_i$ actually measured at output nodes Ri and corrected by the correction values $R^{DC}_i$. The correction values $R^{DC}_i$ here represent a common mode rejection for time-invariant error contributions.

In case it is not guaranteed that the frequencies $\omega_{LO}$ and $\omega_S$ are different, it may introduce an error when simply subtracting the DC terms from above, because the spectrum does contain a DC part. In that case a more elaborated subtraction method can be used to only remove an unwanted DC part of the spectrum. This can be done e.g. by selectively switching off the optical input signal 30 and measuring the output of the balanced detectors 280 defining a first set of signals. Switching off the reference signal LO and measuring the DC output of the balanced detectors 280 defines a second set of signals. Normalizing the measurement of the output of the balanced receiver $R^{meas}_i$ (i=1, . . . , 4) with the optical power of the optical input signal 30 or the reference signal LO results in:

$$b_1 = R^{meas}_1(S^{TE}=0)/LO^2 = (IL_{LO,I_1} - IL_{LO,I_2})$$

$$b_2 = R^{meas}_1(LO=0)/S^2 = (IL_{S^{TE},I_1} - IL_{S^{TE},I_2}) \cdot S^{TE^2}/S^2$$

$$b_3 = R^{meas}_2(S^{TE}=0)/LO^2 = (IL_{LO,Q_1} - IL_{LO,Q_2})$$

$$b_4 = R^{meas}_2(LO=0)/S^2 = (IL_{S^{TE},Q_1} - IL_{S^{TE},Q_2}) \cdot S^{TE^2}/S^2$$

$$b_5 = R^{meas}_3(S^{TM}=0)/LO^2 = (IL_{LO,I_3} - IL_{LO,I_4})$$

$$b_6 = R^{meas}_3(LO=0)/S^2 = (IL_{S^{TM},I_3} - IL_{S^{TM},I_4}) \cdot S^{TM^2}/S^2$$

$$b_7 = R^{meas}_4(S^{TM}=0)/LO^2 = (IL_{LO,Q_3} - IL_{LO,Q_4})$$

$$b_8 = R^{meas}_4(LO=0)/S^2 = (IL_{S^{TM},Q_3} - IL_{S^{TM},Q_4}) \cdot S^{TM^2}/S^2$$

With known values of the optical power of the optical input signal 30 and the reference signal LO, an alternative first set of correction values can be calculated $$R^{DC}_1 = b_1 \cdot LO^2 + b_2 \cdot S^2$$

$$R^{DC}_2 = b_3 \cdot LO^2 + b_4 \cdot S^2$$

$$R^{DC}_3 = b_5 \cdot LO^2 + b_6 \cdot S^2$$

$$R^{DC}_4 = b_7 \cdot LO^2 + b_8 \cdot S^2$$

Again subtracting the first set of correction values as defined above from the measured signals will suppress the unwanted DC part of the spectrum and result in the following mixing terms:

$$R_1^{AC} = R_1^{meas} - b_1 \cdot LO^2 - b_2 \cdot S^2$$
$$= \left(\sqrt{IL_{STE,I_1}}\sqrt{IL_{LO,I_1}} + \sqrt{IL_{STE,I_2}}\sqrt{IL_{LO,I_2}}\right) \cdot 2 \cdot S^{TE} \cdot LO \cdot$$
$$\cos((\omega_S - \omega_{LO}) \cdot t + (\omega_S - \omega_{LO}) \cdot (t_{I_1} - t_{I_2}))$$

$$R_2^{AC} = R_2^{meas} - b_3 \cdot LO^2 - b_4 \cdot S^2$$
$$= \left(\sqrt{IL_{STE,Q_1}}\sqrt{IL_{LO,Q_1}} + \sqrt{IL_{STE,Q_2}}\sqrt{IL_{LO,Q_2}}\right) \cdot 2 \cdot S^{TE} \cdot$$
$$LO \cdot \cos((\omega_S - \omega_{LO}) \cdot t + (\omega_S - \omega_{LO}) \cdot (t_{Q_1} - t_{Q_2}) + \varphi_{STE})$$

$$R_3^{AC} = R_3^{meas} - b_5 \cdot LO^2 - b_6 \cdot S^2$$
$$= \left(\sqrt{IL_{STM,I_3}}\sqrt{IL_{LO,I_3}} + \sqrt{IL_{STM,I_4}}\sqrt{IL_{LO,I_4}}\right) \cdot 2 \cdot S^{TM} \cdot$$
$$LO \cdot \cos((\omega_S - \omega_{LO}) \cdot t + (\omega_S - \omega_{LO}) \cdot (t_{I_3} - t_{I_4}))$$

$$R_4^{AC} = R_4^{meas} - b_7 \cdot LO^2 - b_8 \cdot S^2$$
$$= \left(\sqrt{IL_{STM,Q_3}}\sqrt{IL_{LO,Q_3}} + \sqrt{IL_{STM,Q_4}}\sqrt{IL_{LO,Q_4}}\right) \cdot 2 \cdot$$
$$S^{TM} \cdot LO \cdot \cos((\omega_S - \omega_{LO}) \cdot t + (\omega_S - \omega_{LO}) \cdot (t_{Q_3} - t_{Q_4}) + \varphi_{STM})$$

Nevertheless the in-phase ($R^{AC}_1$, $R^{AC}_3$) and quadrature ($R^{AC}_2$, $R^{AC}_4$) terms still suffer from different loss. If a spectrum is calculated from the above 4 terms using Fourier-transformation, the true spectrum can be distorted by a ghost spectrum, for which the frequency axis is reversed. This distortion of the spectrum is independent from the distortion due to the unwanted DC part. Both corrections can therefore be used independently or in parallel. To suppress the ghost spectrum in order to be able to measure the undistorted spectrum, 16 loss values ($p_i$—see below) have to be measured independently. This can be done by providing the signal path 40 and the local oscillator LO to be switchable (i.e. the optical input signal 30 can be coupled to or removed from the input 40, and the reference signal LO can be coupled to or removed from the input 50), and by measuring (and normalizing) the bias current (of bias circuits 200A-270A) of the individual photodiodes 200-270 (according to photodiodes 200 and 210 in FIG. 3) of the balanced receivers 280A-D.

The measurement of the bias current represents the optical power $p_1$-$p_{16}$ at the respective photodiode. The measurements of the bias currents of the photodiodes that constitute the balanced receivers 280A-D with switched off signal 30 defines a third set of signals while the same measurements with switched off LO define a fourth set of signals. Again the measurements are normalized using the respective optical power of the signal input 30 or LO:

$$p_1 = |I_1(S^{TE}=0)|^2/LO^2 = IL_{LO,I_1}$$

$$p_2 = |I_1(LO=0)|^2/S^2 = IL_{S^{TE},I_1} \cdot S^{TE^2}/S^2$$

$$p_3 = |I_2(S^{TE}=0)|^2/LO^2 = IL_{LO,I_2}$$

$$p_4 = |I_2(LO=0)|^2/S^2 = IL_{S^{TE},I_2} \cdot S^{TE^2}/S^2$$

$$p_5 = |Q_1(S^{TE}=0)|^2/LO^2 = IL_{LO,Q_1}$$

$$p_6 = |Q_1(LO=0)|^2/S^2 = IL_{S^{TE},Q_1} \cdot S^{TE^2}/S^2$$

$$p_7 = |Q_2(S^{TE}=0)|^2/LO^2 = IL_{LO,Q_2}$$

$$p_8 = |Q_2(LO=0)|^2/S^2 = IL_{S^{TE},Q_2} \cdot S^{TE^2}/S^2$$

$$p_9 = |I_3(S^{TM}=0)|^2/LO^2 = IL_{LO,I_3}$$

$$p_{10} = |I_3(LO=0)|^2/S^2 = IL_{S^{TM},I_3} \cdot S^{TM^2}/S^2$$

$$p_{11}=|I_4(S^{TM}=0)|^2/LO^2=IL_{LO,I_4}$$

$$p_{12}=|I_4(LO=0)|/S^2=IL_{S^{TM},I_4}\cdot S^{TM^2}/S^2$$

$$p_{13}=|Q_3(S^{TM}=0)|^2/LO^2=IL_{LO,Q_3}$$

$$p_{14}=|Q_3(LO=0)|^2/S^2=IL_{S^{TM},Q_3}\cdot S^{TM^2}/S^2$$

$$p_{15}=|Q_4(S^{TM}=0)|^2/LO^2=IL_{LO,Q_4}$$

$$p_{16}=|Q_4(LO=0)|^2/S^2=IL_{S^{TM},Q_4}\cdot S^{TM^2}/S^2$$

The value $p_1$ represents the value of the current of bias circuit 200A as measured when the signal 30 is switched off. The value $p_2$ represents the value of the current of bias circuit 200A as measured when the signal LO is switched off. The value $p_3$ represents the value of the current of bias circuit 210A as measured when the signal 30 is switched off. The value $p_4$ represents the value of the current of bias circuit 210A as measured when the signal LO is switched off. Accordingly, the values $p_5$ and $p_6$ are measured at bias circuit 220A, the values $p_7$ and $p_8$ are measured at bias circuit 230A, etc.

The third and fourth set of signals from above can be used to calculate a second set of correction values $G_1$-$G_4$:

$$G_1 = \frac{1}{2\cdot\left(\sqrt{p_1\cdot p_2}+\sqrt{p_3\cdot p_4}\right)}$$

$$G_2 = \frac{1}{2\cdot\left(\sqrt{p_5\cdot p_6}+\sqrt{p_7\cdot p_8}\right)}$$

$$G_3 = \frac{1}{2\cdot\left(\sqrt{p_9\cdot p_{10}}+\sqrt{p_{11}\cdot p_{12}}\right)}$$

$$G_4 = \frac{1}{2\cdot\left(\sqrt{p_{13}\cdot p_{14}}+\sqrt{p_{15}\cdot p_{16}}\right)}$$

Multiplying the mixing terms with the respective correction values will result in mixing terms in which the peaks of the ghost spectrum are effectively suppressed:

$$\frac{R_1^{AC}}{2\cdot\left(\sqrt{p_1\cdot p_2}+\sqrt{p_3\cdot p_4}\right)}=$$
$$S\cdot LO\cdot\cos((\omega_S-\omega_{LO})\cdot t+(\omega_S-\omega_{LO})\cdot(t_{I_1}-t_{I_2}))$$

$$\frac{R_2^{AC}}{2\cdot\left(\sqrt{p_5\cdot p_6}+\sqrt{p_7\cdot p_8}\right)}=$$
$$S\cdot LO\cdot\sin((\omega_S-\omega_{LO})\cdot t+(\omega_S-\omega_{LO})\cdot(t_{Q_1}-t_{Q_2})+\varphi_{S^{TE}})$$

$$\frac{R_3^{AC}}{2\cdot\left(\sqrt{p_9\cdot p_{10}}+\sqrt{p_{11}\cdot p_{12}}\right)}=$$
$$S\cdot LO\cdot\cos((\omega_S-\omega_{LO})\cdot t+(\omega_S-\omega_{LO})\cdot(t_{I_3}-t_{I_4}))$$

$$\frac{R_4^{AC}}{2\cdot\left(\sqrt{p_{13}\cdot p_{14}}+\sqrt{p_{15}\cdot p_{16}}\right)}=$$
$$S\cdot LO\cdot\sin((\omega_S-\omega_{LO})\cdot t+(\omega_S-\omega_{LO})\cdot(t_{Q_3}-t_{Q_4})+\varphi_{S^{TM}})$$

Figure 4:
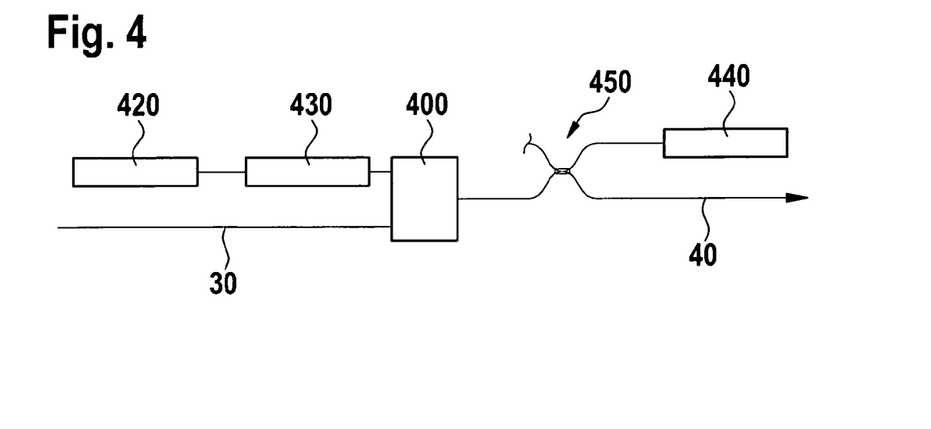
FIG. 4 shows an embodiment of an optical front-end to the downconverter 20.

FIG. 4 shows an embodiment of an optical front-end to the downconverter 20 allowing to self-calibrate the system. The LO is switched off to measure the second and fourth set of signals. This can be done by directly controlling the LO or by an additional switch (not shown in FIG. 4) between the LO and the downconverter 20. Further in FIG. 4, a switch 400 is coupled between the signal 30 and the signal input 40. An unpolarized signal 410 is coupled to the switch 400, and the switch 400 can switch one of the signal 30 and the unpolarized signal 410 to the signal input 40. The unpolarized signal 410 represents a non-polarized signal having a degree of polarization of substantially zero, and may be embodied—as shown in the embodiment of FIG. 4—by an broad band light source 420 with short coherence length that can be effectively depolarized using a a depolarizer 430, e.g. a passive Lyot-type depolarizer. Examples for broad band light sources are SLEDs (superluminescent light emitting diodes), ASE sources (amplified spontaneous emission sources) or conventional LEDs. Instead of passive depolarizers active depolarizers using fiber stretchers that modify the birefringence of optical fiber or electro-optic modulators can be used. A photodiode 440 coupled by a coupler 450 after the switch 400 can be applied to calibrate the overall signal in terms of absolute power.

The correction with the second set of correction values will normalize the spectrum for the two polarizations (denoted by subscript TE and TM). In order to retain the power ratio of the two spectra, a different correction can be applied. For that purpose the unpolarized light is fed to the downconverter instead of the input signal. Measurement of the bias current $p_{2,d}$ to $p_{16,d}$ results in a sixth set of signals. The fifth set of signals is identical to the third set of signals.

$$S^{TE}=S^{TM}=\sqrt{1/2}\cdot S_d$$

$$p_{2,d}=2\cdot|I_1(LO=0)|^2/S_d^2=IL_{S^{TE},I_1}$$

$$p_{4,d}=2\cdot|I_2(LO=0)|^2/S_d^2=IL_{S^{TE},I_2}$$

$$p_{6,d}=2\cdot|Q_1(LO=0)|^2/S_d^2=IL_{S^{TE},Q_1}$$

$$p_{8,d}=2\cdot|Q_2(LO=0)|^2/S_d^2=IL_{S^{TE},Q_2}$$

$$p_{10,d}=2\cdot|I_3(LO=0)|^2/S_d^2=IL_{S^{TM},I_3}$$

$$p_{12,d}=2\cdot|I_4(LO=0)|^2/S_d^2=IL_{S^{TM},I_4}$$

$$p_{14,d}=2\cdot|I_3(LO=0)|^2/S_d^2=IL_{S^{TM},Q_3}^2$$

$$p_{16,d}=2\cdot|Q_4(LO=0)|^2/S_d^2=IL_{S^{TM},Q_4}$$

The fifth (or third) and sixth set of signals from above can be used to calculate a third set of correction values ($G_{1,d}$-$G_{4,d}$):

$$G_{1,d} = \frac{1}{2\cdot\left(\sqrt{p_1\cdot p_{2,d}}+\sqrt{p_3\cdot p_{4,d}}\right)}$$

$$G_{2,d} = \frac{1}{2\cdot\left(\sqrt{p_5\cdot p_{6,d}}+\sqrt{p_7\cdot p_{8,d}}\right)}$$

$$G_{3,d} = \frac{1}{2\cdot\left(\sqrt{p_9\cdot p_{10,d}}+\sqrt{p_{11}\cdot p_{12,d}}\right)}$$

$$G_{4,d} = \frac{1}{2\cdot\left(\sqrt{p_{13}\cdot p_{14,d}}+\sqrt{p_{15}\cdot p_{16,d}}\right)}$$

Multiplying the mixing terms with its respective correction values will result in mixing terms in which the peaks of the ghost spectrum are effectively suppressed and the ratio between the terms for the both polarizations is retained.

$$\frac{R_1^{AC}}{2 \cdot \left(\sqrt{p_1 \cdot p_{2,d}} + \sqrt{p_3 \cdot p_{4,d}}\right)} =$$

$$S^{TE} \cdot LO \cdot \cos((\omega_S - \omega_{LO}) \cdot t + (\omega_S - \omega_{LO}) \cdot (t_{I_1} - t_{I_2}))$$

$$\frac{R_2^{AC}}{2 \cdot \left(\sqrt{p_5 \cdot p_{6,d}} + \sqrt{p_7 \cdot p_{8,d}}\right)} =$$

$$S^{TE} \cdot LO \cdot \sin((\omega_S - \omega_{LO}) \cdot t + (\omega_S - \omega_{LO}) \cdot (t_{Q_1} - t_{Q_2}) + \varphi_{S^{TE}})$$

$$\frac{R_3^{AC}}{2 \cdot \left(\sqrt{p_9 \cdot p_{10,d}} + \sqrt{p_{11} \cdot p_{12,d}}\right)} =$$

$$S^{TM} \cdot LO \cdot \cos((\omega_S - \omega_{LO}) \cdot t + (\omega_S - \omega_{LO}) \cdot (t_{I_3} - t_{I_4}))$$

$$\frac{R_4^{AC}}{2 \cdot \left(\sqrt{p_{13} \cdot p_{14,d}} + \sqrt{p_{15} \cdot p_{16,d}}\right)} =$$

$$S^{TM} \cdot LO \cdot \sin((\omega_S - \omega_{LO}) \cdot t + (\omega_S - \omega_{LO}) \cdot (t_{Q_3} - t_{Q_4}) + \varphi_{S^{TM}})$$

When looking at the above expressions, the first correction removes unwanted DC terms that result in a DC peak in the spectrum, and the second correction removes gain errors that result in ghost peaks in the spectrum. There might still remain a difference of the corrected values compared with the true values. In the argument of the cosine there is an additional phase term that originates from a wrong optical phase delay and from the skew of the channels. The optical phase delay $\phi_{TE}$ and $\phi_{TM}$ for the both polarizations and the skew $t_{I1}$-$t_{I2}$-$t_{Q1}$-$t_{Q2}$ for the TE polarization and the skew $t_{I3}$-$t_{I4}$-$t_{Q3}$-$t_{Q4}$ for the TM polarization can be measured when looking at the phase difference between the corrected signals $R^{AC}_1$ (in-phase) and $R^{AC}_2$ (quadrature) for TE polarization and between $R^{AC}_3$ (in-phase) and $R^{AC}_4$ (quadrature) for the TM polarization $$\Delta\phi^{TE} = (\omega_S - \omega_{LO}) \cdot (t_{I_1} - t_{I_2} - t_{Q_1} + t_{Q_2}) - \phi_S^{TE} = \Delta\omega \cdot \Delta t^{TE} - \phi_S^{TE}$$

$$\Delta\phi^{TM} = (\omega_S - \omega_{LO}) \cdot (t_{I_3} - t_{I_4} - t_{Q_3} + t_{Q_4}) - \phi_S^{TM} = \Delta\omega \cdot \Delta t^{TM} - \phi_S^{TM}$$

Those two equations (one for each polarization) describe a straight line line with frequency difference $\omega_S - \omega_{LO}$, being the ordinate and the actual phase difference being the abscissa, so that two measurements of frequency difference and phase difference yield the slope (skew difference) and offset (optical phase difference). In order to measure the phase difference at different values a narrow line width source is connected to the signal input. By adjusting the wavelength difference between signal input source and local oscillator the frequency difference can be adjusted. The phase difference can then be measured by comparing the in-phase and quadrature signals.

If done at least two different frequency differences the slope and offset (optical phase delay and skew) can be extracted from the measurement. Repeating this measurement at different average wavelength values of local oscillator and signal source can reveal any wavelength dependency of both quantities.

Skew values are typical numbers that might not be measured within the instrument and that typically don't change dramatically over time or environmental conditions.

In a very simple approach offset (first set of correction values) and relative gain correction (second or third set of correction) may be neglected and given factory calibration values may be used which could be wavelength dependent, the actual wavelength to be used should be that of the local oscillator.

As the optical phase angle between in-phase and quadrature signals as provided by the phaseshifters 180 and 190 might not be the ideal value of 90°, a correction term for the 90° data can be calculated. The actual measured data can be calculated from the true data using the following math (note that $\alpha$ and $\beta$ might depend on the actual wavelength):

$$R^{meas}_1 = R_1 \cdot \cos(\alpha) + R_2 \cdot \sin(\alpha)$$

$$R^{meas}_2 = R_1 \cdot \cos(\beta) - R_2 \cdot \sin(\beta)$$

Figure 5:
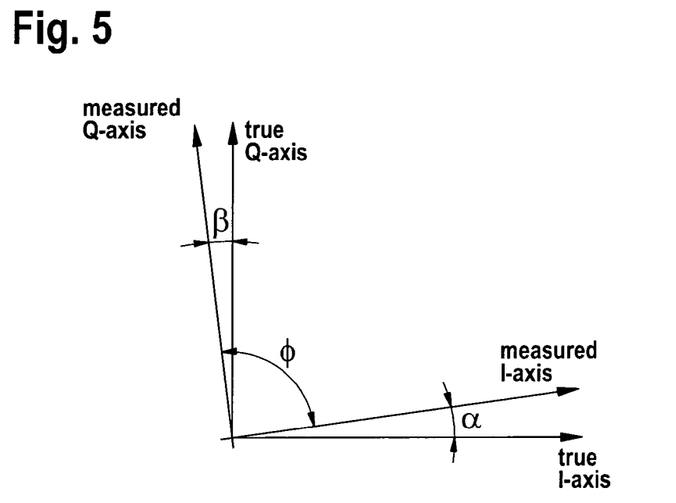
FIG. 5 depicts the relationship of the angles between in-phase and quadrature signals as provided by the phaseshifters.

FIG. 5 depicts the relationship of the angles. The individual error angles $\alpha$, $\beta$ cannot be measured. However, angle $\phi$ which is the optical phase delay can be measured as outlined for which the following relation holds true:

$$\pi/2 = \alpha + \phi - \beta$$

The following choice always fulfills the above relation:

$$\alpha = \pi/4 - \phi/2$$

$$\beta = \phi/2 - \pi/4$$

Using this choice one can calculate the true values from the measured ones using:

$$R_1 = \frac{R_1^{meas} \cdot \sin(\phi/2 + \pi/4) - R_2^{meas} \cdot \cos(\phi/2 + \pi/4)}{2 \cdot \sin(\phi/2 + \pi/4)^2 - 1}$$

$$R_2 = \frac{R_1^{meas} \cdot \cos(\phi/2 + \pi/4) - R_2^{meas} \cdot \sin(\phi/2 + \pi/4)}{2 \cdot \sin(\phi/2 + \pi/4)^2 - 1}$$

Calibration can be done within the instrument on a regular basis (e.g. at boot time, periodically, after certain changes in temperature, before each measurement or at combinations of the above conditions) and may not need certain signals to be present at the input. This so called self-calibration is very powerful to mitigate any changes in the properties of the instrument and can be used as vehicle to monitor any type of degradation. On the other hand it might impact the usability of the instrument since it consumes certain time.

The calibration might alternatively or in addition be done in factory (i.e. after manufacturing or as a specific calibration service which might be provided e.g. by the manufacturer) and might require additional instrumentation and/or signals. Factory calibration is in particular useful for values showing a certain stability of the calibrated values, which might be proven by certain tests (such as environmental testing). Typically the cable length of the optical and RF cables can be assumed to be stable within certain accuracy limits.

The invention claimed is:
1. A method of calibrating an optical downconverter configured to receive an optical input signal at a signal input and an optical reference signal at a reference input, and to provide a plurality of characterizing signals at a plurality of output nodes for characterizing the optical input signal, wherein the downconverter comprises a plurality of receivers, having optical inputs and electrical outputs corresponding to the plurality of output nodes, respectively providing the plurality of characterizing signals, and a plurality of optical signal paths, each optical signal path being connected between one of the signal and reference inputs and one of the optical inputs of the plurality of receivers, the method comprising:
   determining signals at the plurality of output nodes;
   deriving from the determined signals a first set of correction values for correcting the plurality of characterizing signals, wherein the first set of correction values relate to insertion loss on the plurality of optical signal paths as a time-independent property of the characterizing signals; and correcting the plurality of characterizing signals with one or more of the derived first set of correction values.

2. The method of claim 1, wherein determining signals at the plurality of output nodes comprises:
disabling the input signal and determining a first set of signals at the plurality of output nodes; and
disabling the reference signal and determining a second set of signals at the plurality of output nodes.

3. The method of claim 2, wherein the first set of correction values are derived from the determined first and second sets of signals.

4. The method of claim 1, further comprising:
averaging the determined signals over time for deriving the first set of correction values.

5. The method of claim 1, further comprising:
determining the signals comprises measuring each respective signal.

6. The method of claim 1, wherein the correction is provided to a measurement of the plurality of characterizing signals succeeding any measurement of the plurality of characterizing signals for deriving the first set of correction values.

7. A non-transitory computer readable medium including a software program, executable by a computer processor, for at least one of controlling and executing the method of claim 1.

8. A method of calibrating an optical downconverter configured to receive an optical input signal at a signal input and an optical reference signal at a reference input, and to provide a plurality of characterizing signals at a plurality of output nodes for characterizing the optical input signal, wherein the downconverter comprises a plurality of receivers, having optical inputs and electrical outputs corresponding to the plurality of output nodes, respectively providing the plurality of characterizing signals, a plurality of optical signal paths, each optical signal path being connected between one of the signal and reference inputs and one of the optical inputs of the plurality of receivers, and at least one phase shifter coupled in one of the plurality of optical signal paths and configured to provide a corresponding phase shift, the method comprising:
coupling a first wavelength signal to the signal input;
determining at one of the output nodes a first beat frequency of the plurality of characterizing signals representing a first mixed frequency resulting from the reference signal and the first wavelength signal;
coupling a second wavelength signal to the signal input, the second wavelength signal having a different wavelength than the first wavelength signal;
determining at one of the output nodes a second beat frequency of the plurality of characterizing signals representing a second mixed frequency resulting from the reference signal and the second wavelength signal; and
deriving a fourth set of correction values from the determined first and second beat frequencies for correcting the plurality of characterizing signals.

9. The method of claim 8, wherein the fourth set of correction values relates to differences in run time between different ones of the optical signal paths.

10. The method of claim 8, further comprising:
determining a first phase difference between two of the characterizing signals with the first wavelength signal coupled to the signal input, wherein one of the characterizing signals is derived from one of the optical signal paths having the phase shifter;
determining a second phase difference between two of the characterizing signals with the second wavelength signal coupled to the signal input, wherein one of the characterizing signals is derived from one of the optical signal paths having the phase shifter; and
deriving a fifth set of correction values from the determined first and second phase differences for correcting the plurality of characterizing signals.

11. The method of claim 10, wherein the fifth set of correction values relates to the phase shift as provided by the phase shifter.

12. A non-transitory computer readable medium including a software program, executable by a computer processor, for at least one of controlling and executing the method of claim 8.

13. An apparatus for calibrating an optical downconverter configured to receive an optical input signal at a signal input and an optical reference signal at a reference input, and to provide at a plurality of output nodes a plurality of characterizing signals for characterizing the optical input signal, wherein the downconverter comprises a plurality of receivers, having corresponding optical inputs and respectively providing the plurality of characterizing signals at the plurality of output nodes, and a plurality of optical signal paths, each optical signal path being connected between one of the signal and reference inputs and one of the optical inputs of the plurality of receivers, the apparatus comprising:
a signal analyzing unit coupled to the plurality of output nodes and configured to receive and analyze the plurality of characterizing signals;
a first switch for selectively enabling the optical input signal; and
a second switch for selectively enabling the reference signal,
wherein the signal analyzing unit is configured to derive correction values based on determined signals at the plurality of output nodes derived from selectively enabling at least one of the optical input signal and the reference signal, and to correct the plurality of characterizing signals with the derived correction values.

14. The apparatus of claim 13, wherein each receiver is a balanced receiver comprising two photodetectors, wherein the respectively provided characterizing signal represents a signal difference between photocurrents provided by the two photodetectors.

15. The apparatus of claim 14, further comprising:
a plurality of bias circuits, each bias circuit being coupled to one of the photodetectors for measuring the photocurrent through the photodetector.

16. The apparatus of claim 15, wherein the signal analyzing unit is further configured to derive the correction values based on the measured photocurrents, and to correct the plurality of characterizing signals with the derived correction values.

17. The apparatus of claim 16, further comprising:
a polarization splitter in one of the plurality of optical signal paths, wherein the polarization splitter is configured to receive an applied signal and to output at least one signal derived from the applied signal, wherein each output signal has a different state of polarization.

18. The apparatus of claim 17, further comprising:
a signal source configured to couple a non-polarized signal to the signal input, wherein the non-polarized signal has a degree of polarization of substantially zero.

* * * * *